UNITED STATES PATENT OFFICE.

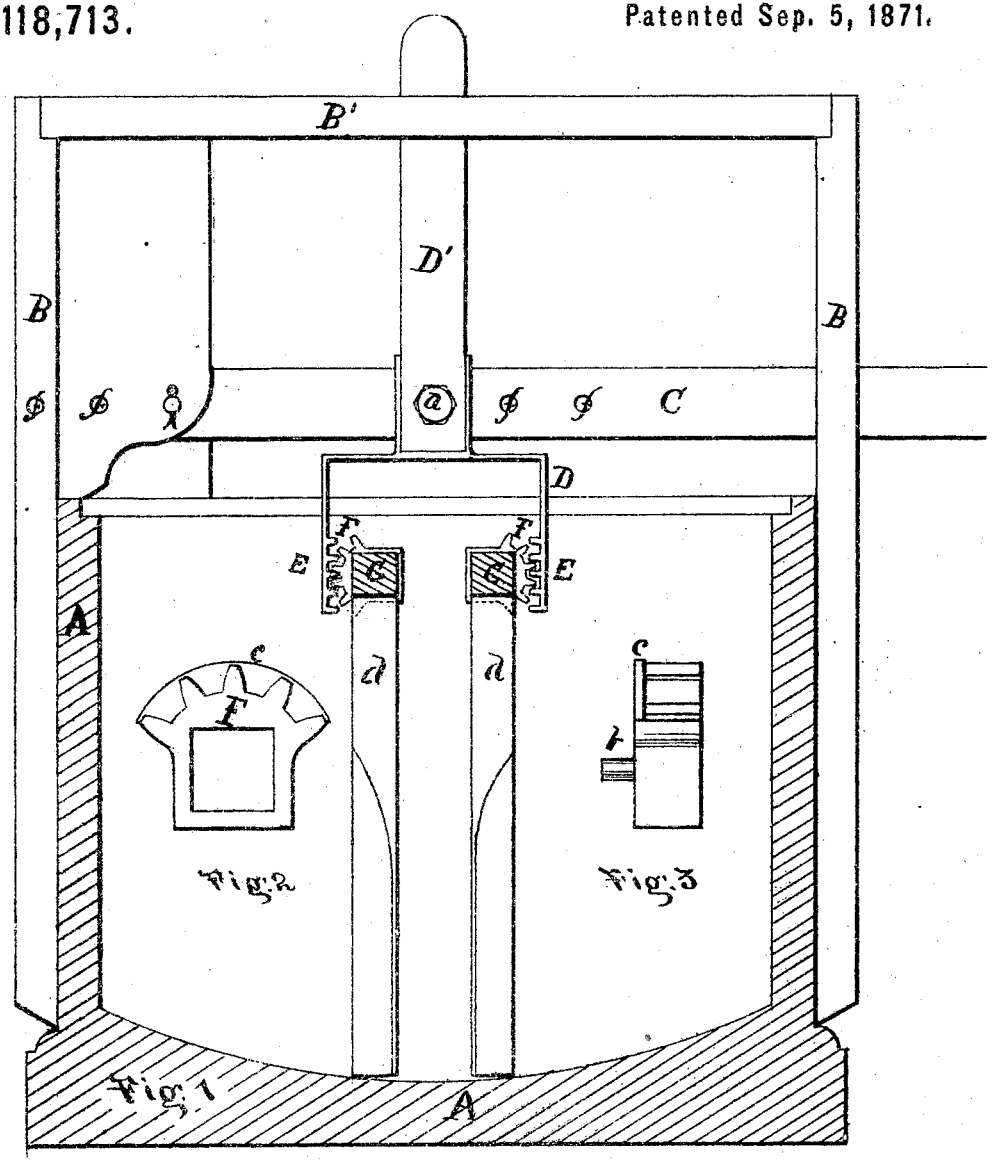

ELIAS GROAT, OF NAPA, CALIFORNIA.

IMPROVEMENT IN CHURNS.

Specification forming part of Letters Patent No. 118,713, dated September 5, 1871.

*To all whom it may concern:*

Be it known that I, ELIAS GROAT, of Napa, in the county of Napa and State of California, have invented an Improved Device for Operating Churns; and I do hereby declare that the following is a full and exact description of the same, reference being had to the accompanying drawing and to the letters of reference marked thereon.

This invention relates to a churn for which application for Letters Patent was made May 6, 1871, and is an improvement thereon, as will be fully described hereinafter. This invention consists, mainly, of a suitable frame-work attached to one end of a churn, having longitudinal workers or paddles, through which a lever passes connected to a vertical gate. The arms of the gate are provided with racks, which work in the teeth of segments on the inner ends of the paddles, while the outer ends of the paddles work in bearings and are held by a latch, by which a transverse reciprocating motion is imparted to the paddles, as will be fully described hereinafter.

In the drawing, Figure 1 represents a transverse vertical end section of my invention and its attachment to the horizontal arms of a churn. Figs. 2, 3, 4, and 5 are details.

Hitherto it would appear that much difficulty has been experienced in transmitting a transverse reciprocating from a rectilinear motion to effect the necessary action in operating churns having paddles on double-parallel axes. The necessity of accomplishing this object will be apparent when viewed in connection with my former application for a patent of a churn in which two such axes with paddles were to be operated by vertical handles, which, as the cream thickens up in the body of the churn, would be difficult to handle, especially in churns of large capacity. Were this the only benefit to be derived the want of a remedy would perhaps never have been felt, but when it is known and fully understood that the lower the temperature at which the cream is acted upon to convert it into butter the better the product will be, and that stirring with paddles having a reciprocating or double transverse motion imparted to them is the most favorable condition under which cream can be made into butter, the value of this invention will be at once perceived. The design, then, of this invention is to cause the cream to be carried from end to end of the churn until it is converted into butter by the action of double-curved paddles on parallel shafts, intersecting each other by a vibrating motion produced by lever power transmitting a rectilinear to a horizontal transverse motion.

To enable others skilled in the art to which my invention appertains to make and use the same, I will now proceed to describe fully my improved device and the appliance for carrying it into effect.

In the drawing, A represents the frame-work of a box or churn, to one end of which is attached a suitable frame, B and B', which is provided with mortises for the working of the operating-lever or handle C. The lever is connected to a yoke, D, by means of a pin, $a$, passing through the upright arm D'. Each side of the yoke is provided with a toothed rack, E, the teeth of which engage the teeth of the sectors F. The sectors F are cast with gudgeons $b$ and a guard or flange, $c$, to prevent friction against or contact with the end of the churn, and are made boxing to fit the ends of the two parallel axes G, to which the paddles $d\ d$ are fixed, and thereby take in the whole dimension of the end of the arm. The opposite gudgeons H are constructed in the same manner and receive the end of the axes or shafts and operate in a bearing-plate, I, at the opposite end of the churn, and when in position a latch, J, shuts over the gudgeons to prevent any upward movement, as represented in Figs. 4 and 5. The operating-lever and frame are provided with holes $f\ f$ so that the relative position of the resistance between the fulcrum and power may be regulated at will.

In operating my device the lever is raised and lowered after the manner of working a pump or bellows, which causes the vertical arm D' to move up and down in the cross-bar B' of the frame and carry with it the yoke with rack on each arm, which engages the teeth of the segments and causes the parallel shafts to move alternately and the paddles to cross or intersect each other's track in a regular and easy manner.

Having thus described my invention, what I claim, and desire to secure by Letters Patent, is—

The vertical racks E and toothed sectors F, in combination with the horizontal shafts G G provided with paddles or beaters which intersect and cross each other's path, substantially as and for the purpose set forth.

In witness whereof I have hereunto set my hand and seal.

ELIAS GROAT. [L. S.]

Witnesses:
C. W. M. SMITH,
H. S. TIBBEY.